United States Patent
Kim et al.

(10) Patent No.: US 9,144,035 B2
(45) Date of Patent: Sep. 22, 2015

(54) TERMINAL EQUIPMENT AND METHOD FOR CONTROLLING UPLINK TRANSMISSION POWER

(75) Inventors: Dongcheol Kim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 14/235,026

(22) PCT Filed: Jul. 27, 2012

(86) PCT No.: PCT/KR2012/006020
§ 371 (c)(1), (2), (4) Date: Jan. 24, 2014

(87) PCT Pub. No.: WO2013/019034
PCT Pub. Date: Feb. 7, 2013

(65) Prior Publication Data
US 2014/0171144 A1     Jun. 19, 2014

Related U.S. Application Data

(60) Provisional application No. 61/512,928, filed on Jul. 29, 2011, provisional application No. 61/523,852, filed on Aug. 16, 2011.

(51) Int. Cl.
*H04W 52/28* (2009.01)
*H04W 72/04* (2009.01)
*H04W 52/36* (2009.01)
*H04W 52/14* (2009.01)

(52) U.S. Cl.
CPC .......... *H04W 52/281* (2013.01); *H04W 52/367* (2013.01); *H04W 72/0413* (2013.01); *H04W 52/146* (2013.01)

(58) Field of Classification Search
CPC .................... H04W 52/281; H04W 72/0413
See application file for complete search history.

(56) References Cited

U.S. PATENT DOCUMENTS

| | | | |
|---|---|---|---|
| 2009/0088160 A1* | 4/2009 | Pani et al. | 455/436 |
| 2010/0080176 A1* | 4/2010 | Maas et al. | 370/329 |
| 2010/0240356 A1* | 9/2010 | Lee et al. | 455/422.1 |
| 2010/0246463 A1 | 9/2010 | Papasakellariou et al. | |
| 2012/0327866 A1* | 12/2012 | Krishnamurthy et al. | 370/329 |

FOREIGN PATENT DOCUMENTS

| | | |
|---|---|---|
| KR | 10-2010-0073976 | 7/2010 |
| WO | 2009/120126 | 10/2009 |
| WO | 2010/148319 | 12/2010 |

OTHER PUBLICATIONS

PCT International Application No. PCT/KR2012/006020, Written Opinion of the International Searching Authority dated Jan. 10, 2013, 17 pages.

* cited by examiner

*Primary Examiner* — Bobbak Safaipour
(74) *Attorney, Agent, or Firm* — Lee, Hong, Degerman, Kang & Waimey

(57) ABSTRACT

The present invention relates to terminal equipment and a method for controlling uplink transmission power. The method, in which terminal equipment controls uplink transmission power in a wireless communication system, includes the steps of: determining uplink transmission power when at least one type of channel is employed for simultaneous transmission at a cell among a first type of channel corresponding to a plurality of PUCCHs, a second type of channel corresponding to PUSCHs including a UCI, and a third type of channel corresponding to PUSCHs excluding the UCI; and transmitting the at least one type of channel via the determined uplink transmission power, wherein the uplink transmission power is determined by applying a scaling factor to a power value of the at least one type of channel when the power value exceeds the maximum transmission power or remaining transmission power.

14 Claims, 9 Drawing Sheets

FIG. 3
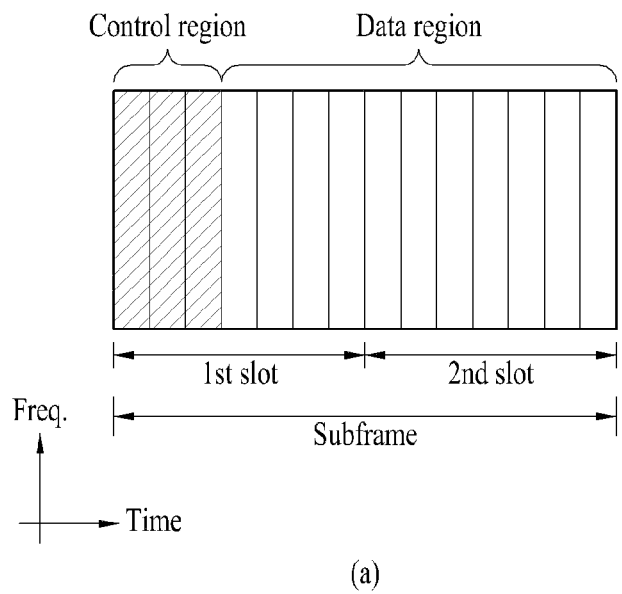
(a)
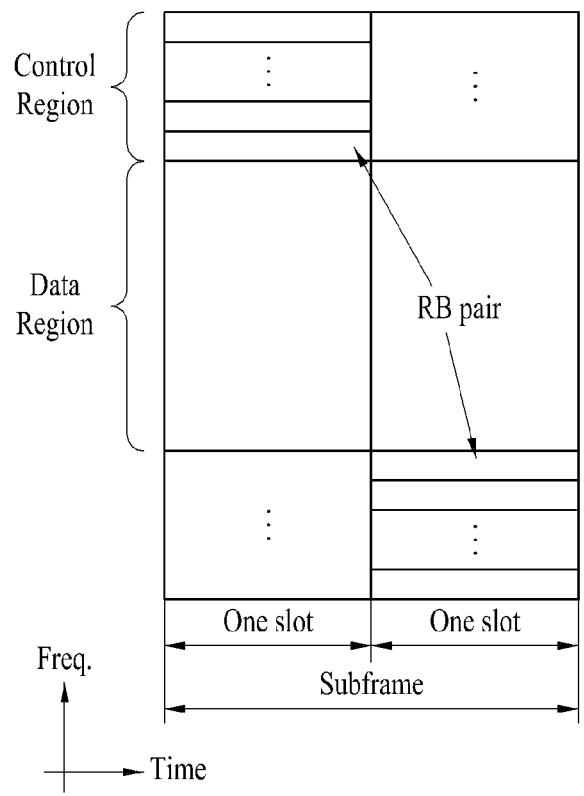
(b)

TERMINAL EQUIPMENT AND METHOD FOR CONTROLLING UPLINK TRANSMISSION POWER

TECHNICAL FIELD

The present invention relates to a wireless access communication system supporting carrier aggregation/multiple cells, and more particularly, to an apparatus and method for controlling uplink transmit power.

BACKGROUND ART

One of the most important requirements of a next generation wireless access system is that high data transmission rate should be supported. To this end, a variety of technologies including multiple input multiple output (MIMO), cooperative multiple point transmission (CoMP), and relays have been studied.

A conventional wireless access system mainly considered only one carrier even though bandwidth of uplink and bandwidth of downlink are differently configured. For example, a wireless communication system in which the number of carriers constituting uplink and the number of carriers constituting downlink are one, respectively, and bandwidth of uplink is generally symmetrical to bandwidth of downlink, based on a single carrier, has been provided.

Nonetheless, in consideration of saturated frequency resources, carrier aggregation (CA)/multiple cells for designing each of dispersed bands to satisfy basic requirements capable of operating an independent system and for aggregating a plurality of bands to one system has been introduced as a method for securing broad bandwidth in order to meet requirements for higher data transmission rate.

In this case, a carrier of a bandwidth unit available for an independent operation may be referred to as a component carrier (CC). To support increasing transmission capacity, bandwidth of a CC is extended to 20 MHz or more in a recent 3GPP long-term evolution-advanced (LTE-A) or 802.16m system. At this time, a broad band is supported by aggregating one or more CCS. For instance, if one CC supports a bandwidth of 5 MHz, 10 MHz, or 20 MHz, system bandwidth up to 100 MHz may be supported by aggregating a maximum of 5 CCs.

DISCLOSURE

Technical Problem

An object of the present invention to be achieved by the present invention is to provide a method by which a user equipment controls uplink transmit power Another object of the present invention to be achieved by the present invention is to provide a user equipment for controlling uplink transmit power.

Technical Solution

The object of the present invention can be achieved by providing a method for controlling uplink transmit power by a user equipment, including adjusting transmit power per channel according to priority of simultaneously transmitted channels.

A parameter of the uplink transmit power may be configured on a timing advance (TA) group basis.

Advantageous Effects

According to an uplink transmit power control method of the present invention, transmit power of a user equipment can be configured when multiple primary cells are present in CA.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included as a part of the detailed description to provide a further understanding of the invention, provide embodiments of the invention and together with the description serve to explain the principle of the invention. In the drawings.

FIG. 3 is a diagram illustrating the structure of downlink and uplink subframes of a 3GPP LTE system which is an exemplary mobile communication system;

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE or LTE-A system as a mobile communication system, it is applicable to other arbitrary mobile communication systems except for matters that are specific to the 3GPP LTE or LTE-A system.

In some instances, known structures and devices are omitted or are shown in block diagram form, focusing on important features of the structures and devices, so as not to obscure the concept of the present invention. The same reference numbers will be used throughout this specification to refer to the same parts.

The following description assumes that a user equipment (UE) refers to a mobile or fixed user equipment such as a mobile station (MS) or an advanced mobile station (AMS) and a base station (BS) refers to an arbitrary node of a network stage, such as a Node B, an eNode B, or access point (AP), communicating with a UE.

In a mobile communication system, a UE may receive information on downlink from a BS, and the UE may transmit information on uplink. Information transmitted and received by the UE includes data and various control information. A variety of physical channels is present according to types or usages of information transmitted or received by the UE.

Figure 1:
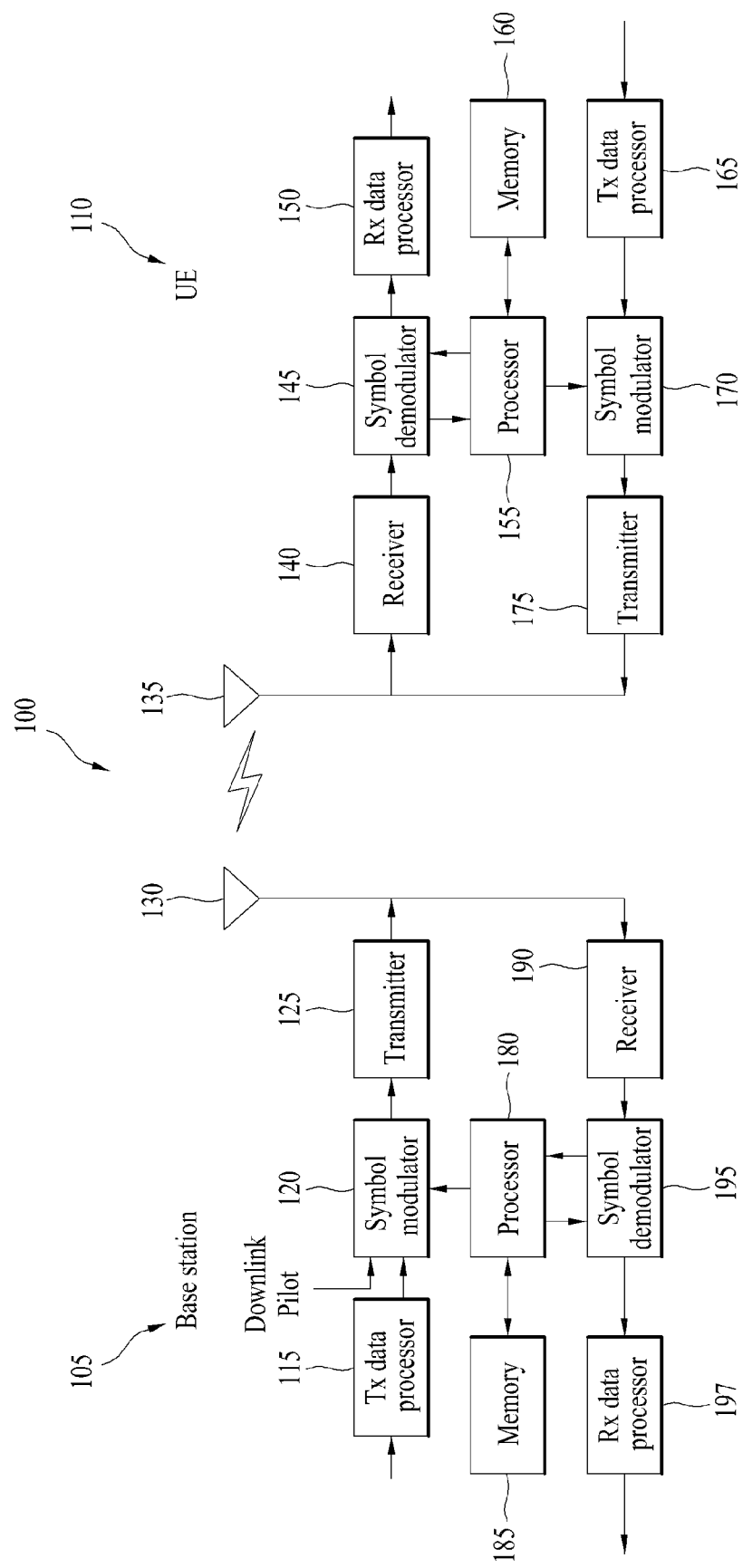
FIG. 1 is a block diagram illustrating the configuration of a BS 105 and a UE 110 in a wireless communication system 100.

FIG. 1 is a block diagram illustrating the configuration of a BS 105 and a UE 110 in a wireless communication system 100.

The wireless communication system 100 depicts one BS 105 and one UE 110 for brevity. However, the wireless communication system 100 may include more than one BS and/or more than one UE.

Referring to FIG. 1, the BS 105 may include a transmission (Tx) data processor 115, a symbol modulator 120, a transmitter 125, a transmission/reception (Tx/Rx) antenna 130, a processor 180, a memory 185, a receiver 190, a symbol demodulator 195, and a reception (Rx) data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. Although one Tx/Rx antenna 130 in the BS and one Tx/Rx antenna 135 in the UE are depicted, each of the BS 105 and the UE 110 includes a plurality of antennas. Accordingly, the BS 105 and the UE 110 according to the present invention support MIMO. The BS 105 according to the present invention may support both a single-user MIMO (SU-MIMO) scheme and a multi-user MIMO (MU-MIMO) scheme. On downlink, the Tx data processor 115 receives, formats, codes, interleaves, and modulates (or symbol-maps) traffic data and provides modulated symbols ("data symbols"). The symbol modulator 120 receives and processes the data symbols and pilot symbols and provides a stream of symbols.

The symbol modulator 120 multiplexes the data and pilot symbols and transmits the multiplexed symbols to the transmitter 125. Each transmission symbol may be a data symbol, a pilot symbol, or a zero-value signal. Pilot symbols may be continuously transmitted in each symbol period. The pilot symbols may be frequency division multiplexed (FDM), orthogonal frequency division multiplexed (OFDM), time division multiplexed (TDM), or code division multiplexed (CDM) symbols.

The transmitter 125 receives and converts the stream of symbols into one or more analog signals and further adjusts (e.g. amplifies, filters, and frequency up-converts) the analog signals to generate downlink signals suitable for transmission over a radio channel. The downlink signals are then transmitted through the antenna 130 to the UE.

In the configuration of the UE 110, the antenna 135 receives the downlink signals from the BS 105 and provides the received signals to the receiver 140. The receiver 140 adjusts (e.g. filters, amplifies, and frequency down-converts) the received signals and digitizes the adjusted signals to obtain samples. The symbol demodulator 145 demodulates received pilot symbols and provides the demodulated pilot symbols to the processor 155 for channel estimation.

The symbol demodulator 145 receives a frequency response estimate for downlink from the processor 155, performs data demodulation upon received data symbols to obtain data symbol estimates (which are estimates of transmitted data symbols), and provides the data symbol estimates to the Rx data processor 150. The Rx data processor 150 demodulates (e.g. symbol-demaps), deinterleaves, and decodes the data symbol estimates to recover the transmitted traffic data.

Processing by the symbol demodulator 145 and the Rx data processor 150 is complementary to processing by the symbol modulator 120 and the Tx data processor 115, respectively, in the BS 105.

On uplink, the Tx data processor 165 of the UE 110 processes traffic data and provides data symbols. The symbol modulator 170 receives and multiplexes the data symbols, performs modulation, and provides a stream of symbols to the transmitter 175. The transmitter 175 then receives and processes the stream of symbols to generate uplink signals, which are transmitted through the antenna 135 to the BS 105.

In the BS 105, the uplink signals from the UE 110 are received through the antenna 130 and the receiver 190 processes the received uplink signals to obtain samples. The symbol demodulator 195 then processes the samples and provides received pilot symbols and data symbol estimates for uplink. The Rx data processor 197 processes the data symbol estimates to recover traffic data transmitted from the UE 110.

The processors 155 and 180 of the UE 110 and the BS 105 direct (e.g. control, adjust, manage, etc.) operation at the UE 110 and the BS 105, respectively. The respective processors 155 and 180 may be connected to the memories 160 and 185, respectively, that store program code and data. The memories 160 and 185 are connected to the processor 180 to store operating systems, applications, and general files.

The processors 155 and 180 may be referred to as controllers, microcontrollers, microprocessors, microcomputers, etc. Meanwhile, the processors 155 and 180 may be implemented by hardware, firmware, software, or combinations thereof. When embodiments of the present invention are achieved using hardware, application specific integrated circuits (ASICs), digital signal processors (DSPs), digital signal processing devices (DSPDs), programmable logic devices (PLDs), or field programmable gate arrays (FPGAs), which are configured to perform the present invention, may be included in the processors 155 and 180.

On the other hand, when embodiments of the present invention are implemented using firmware or software, firmware or software may be configured to include a module, a procedure, a function, etc. performing functions or operations of the present invention. The firmware or software configured to perform the present invention may be included in the processors 155 and 180 or stored in the memories 160 and 185 so as to be executed by the processors 155 and 180.

Layers of a radio interface protocol between the UE and the BS and a wireless communication system (network) may be divided into a first layer (L1), a second layer (L2), and a third layer (L3), based on the three lower layers of the open systems interconnection (OSI) model widely known in the art of communication systems. A physical layer belongs to the first layer and provides information transfer services through a physical channel. A radio resource control (RRC) layer belongs to the third layer and provides control radio resources between the UE and the network. The UE and the BS may exchange RRC messages with the wireless communication network through the RRC layer.

Figure 2:
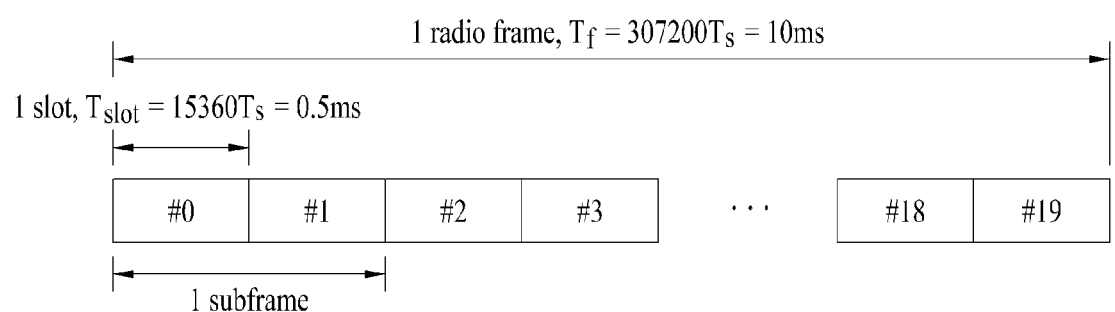
FIG. 2 is a diagram illustrating the structure of a radio frame used in a 3GPP LTE system which is an exemplary mobile communication system.

FIG. 2 is a diagram illustrating the structure of a radio frame used in a 3GPP LTE system which is an exemplary mobile communication system.

Referring to FIG. 2, one radio frame has a length of 10 ms (327200 $T_s$) and includes 10 equal-sized subframes. Each of the subframes has a length of 1 ms and includes two slots. Each of the slots has a length of 0.5 ms (15360 $T_s$). In this case, $T_s$ denotes sampling time and is represented by $T_s=1/(15 kHz \times 2048)=3.2552 \times 10^{-8}$ (about 33 ns). Each slot includes a plurality of OFDM symbols or single carrier-frequency division multiple access (SC-FDMA) symbols in a time domain and includes a plurality of resource blocks in a frequency domain.

In the LTE system, one resource block includes 12 subcarriers×7 (or 6) OFDM symbols or SC-FDMA symbols. A transmission time interval (TTI) which is a unit time for data transmission may be determined in units of one or more subframes. The above-described structure of the radio frame is purely exemplary and various modifications may be made in the number of subframes included in the radio frame, the number of slots included in a subframe, and the number of OFDM or SC-FDMA symbols included in a slot.

FIG. 3 is a diagram illustrating the structure of downlink and uplink subframes of a 3GPP LTE system which is an exemplary mobile communication system.

Referring to (a) of FIG. 3, one downlink subframe includes two slots in the time domain. A maximum of 3 front OFDM symbols of the first slot within the downlink subframe corresponds to a control region in which control channels are allocated, and the other OFDM symbols correspond to a data region in which a physical downlink shared channel (PDSCH) is allocated.

Downlink control channels used in the 3GPP LTE system include a physical control format indicator channel (PCFICH), a physical downlink control channel (PDCCH), a physical hybrid-ARQ indicator channel (PHICH), etc. The PCFICH, which is transmitted in the first OFDM symbol of a subframe, carries information about the number of OFDM symbols (i.e. the size of the control region) used for transmission of control channels within the subframe. Control information transmitted through the PDCCH is referred to as downlink control information (DCI). The DCI indicates uplink resource allocation information, downlink resource allocation information, and uplink transmit power control commands for certain UE groups. The PHICH carries an acknowledgement (ACK)/negative-acknowledgement (NACK) signal for uplink hybrid automatic repeat request (HARQ). Namely, the ACK/NACK signal for uplink data transmitted by a UE is transmitted through the PHICH. Now, a PDCCH, which is a downlink physical channel, is described.

A BS may transmit, on the PDCCH, information about resource allocation and a transport format of a PDSCH (referred to as downlink (DL) grant), resource allocation information of a PUSCH (referred to as uplink (UL) grant), a set of transmit power control (TPC) commands for individual UEs of a UE group, and voice over Internet protocol (VoIP) activation information. The BS may transmit a plurality of PDCCHs in a control region and a UE may monitor the plurality of PDCCHs. A PDCCH is configured by an aggregate of one or multiple consecutive control channel elements (CCEs). The BS may transmit the PDCCH including an aggregate of one or multiple consecutive CCEs in the control region after sub-block interleaving. A CCE is a logical allocation unit used to provide a code rate according to the state of a radio channel to the PDCCH. The CCE corresponds to a plurality of resource element groups. The format of a PDCCH and the number of available bits for the PDCCH are determined according to the correlation between the number of CCEs and a code rate provided by the CCEs.

Control information transmitted on the PDCCH is referred to as downlink control information (DCI). The following Table 1 shows DCI according to DCI formats.

TABLE 1

| DCI format | Description |
| --- | --- |
| DCI format 0 | Used for the scheduling of PUSCH |
| DCI format 1 | Used for the scheduling of one PDSCH codeword |
| DCI format 1A | Used for the compact scheduling of one PDSCH codeword and random access procedure initiated by a PDCCH order |
| DCI format 1B | Used for the compact scheduling of one PDSCH codeword with precoding information |
| DCI format 1C | Used for very compact scheduling of one PDSCH codeword |
| DCI format 1D | Used for the compact scheduling of one PDSCH codeword with precoding and power offset information |
| DCI format 2 | Used for scheduling PDSCH to UEs configured in closed-loop spatial multiplexing mode |
| DCI format 2A | Used for scheduling PDSCH to UEs configured in open-loop spatial multiplexing mode |
| DCI format 3 | Used for the transmission of TPC commands for PUCCH and PUSCH with 2-bit power adjustments |
| DCI format 3A | Used for the transmission of TPC commands for PUCCH and PUSCH with single bit power adjustments |

DCI format 0 indicates uplink resource allocation information. DCI formats 1 and 2 indicate downlink resource allocation information. DCI formats 3 and 3A indicate uplink TPC commands for arbitrary UE groups. DCI format 3/3A includes TPC commands for a plurality of UEs. In the case of DCI format 3/3A, the BS masks a cyclic redundancy check (CRC) with a TPC-identifier (ID). The TPC-ID is an identifier that the UE demasks to monitor a PDCCH carrying a TPC command. The TPC-ID may be an identifier that the UE uses to decode the PDCCH in order to check whether the TPC command is transmitted on the PDCCH. Existing identifiers, i.e. a cell-radio network temporary identifier (C-RNTI), a paging indication-radio network temporary identifier (PI-RNTI), a system change-radio network temporary identifier (SC-RNTI), and a random access-radio network temporary identifier (RA-RNTI) may be reused to define the TPC-ID or a new identifier may be defined as the TPC-ID. The TPC-ID is different from the C-RNTI acting as an identifier of a specific UE and is also different from the PI-RNTI, SC-RNTI, and RA-RNTI of identifiers for all UEs in a cell, in that the TPC-ID is an identifier for UEs of a specific set in a cell. If DCI includes TPC commands for N UEs, only the N UEs need to receive the TPC commands. If TPC commands for all UEs in a cell are contained in DCI, the TPC-ID is used as an identifier for all the UEs in the cell.

The UE monitors a set of PDCCH candidates in a search space contained in a subframe to search for the TPC-ID. In this case, the TPC-ID may be found either in a common search space or in a UE-specific search space. The common search space is a search space in which all UEs contained in the cell can perform the search operation. The UE-specific search space is a search space in which a specific UE can perform the search operation. If no CRC error is detected when the TPC-ID has been demasked in the corresponding PDCCH candidate, the UE may receive a TPC command on a PDCCH.

An identifier for a PDCCH carrying only a plurality of TPC commands, i.e. TPC-ID, is defined. If the TPC-ID is detected, the UE receives a TPC command on the corresponding PDCCH. The TPC command is used to adjust transmit power of an uplink channel. Therefore, the TPC command may prevent failure of data transmission to a BS due to incorrect power control or prevent interference with other UEs.

Hereinbelow, a resource mapping method of a BS for PDCCH transmission in an LTE system will be described in brief.

Generally, the BS may transmit scheduling allocation information and other control information on a PDCCH. A physical control channel may be transmitted on an aggregate of one or plural consecutive CCEs. One CCE includes 9 REGs. The number of REGs which are not allocated to a PCFICH or PHICH is $N_{REG}$. The number of available CCEs in the system is from 0 to $N_{CCE}-1$ (where $N_{CCE}=\lfloor N_{REG}/9 \rfloor$). The PDCCH supports multiple formats as shown in the following Table 2. One PDCCH including n consecutive CCEs starts from a CCE performing i mod n=0 (where i is a CCE number). Multiple PDCCHs may be transmitted in one subframe.

TABLE 2

| PDCCH format | Number of CCEs | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the BS may determine a PDCCH format depending on to how many regions control information is to be transmitted. The UE may reduce overhead by reading control information in units of CCEs.

Referring to (b) of FIG. 3, an uplink subframe may be divided into a control region and a data region in the frequency domain. The control region is assigned a physical uplink control channel (PUCCH) carrying uplink control information. The data region is assigned a physical uplink shared channel (PUSCH) carrying user data. To maintain a single carrier property, one UE does not transmit the PUCCH and the PUSCH simultaneously. A PUCCH for one UE may be allocated as a resource block (RB) pair in one subframe. RBs belonging to the RB pair occupy different subcarriers in two slots. The RB pair allocated to the PUCCH is frequency-hopped at a slot boundary.

Figure 4:
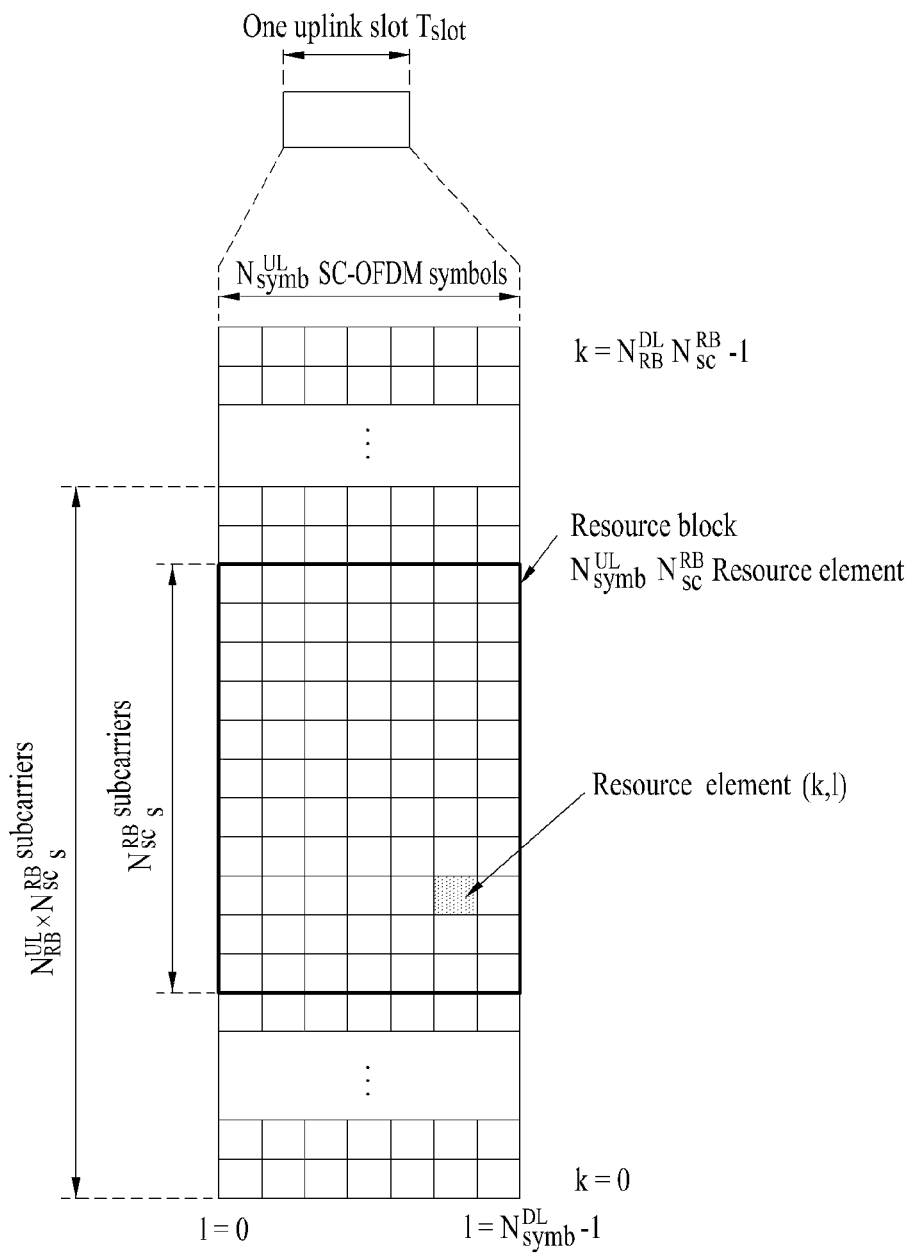
FIG. 4 is a diagram illustrating a downlink time-frequency resource grid structure in a 3GPP LTE system.

FIG. 4 is a diagram illustrating a downlink time-frequency resource grid structure in a 3GPP LTE system.

A downlink signal transmitted in each slot uses a resource grid structure including $N_{RB}^{DL} \times N_{SC}^{RB}$ subcarriers and $N_{symb}^{DL}$ OFDM symbols, wherein $N_{RB}^{DL}$ represents the number of RBs in downlink, $N_{SC}^{RB}$ represents the number of subcarriers constituting one RB, and $N_{symb}^{DL}$ represents the number of OFDM symbols in one downlink slot. The size of $N_{RB}^{DL}$ varies according to downlink transmission bandwidth configured in a cell and should satisfy $N_{RB}^{min,DL} \leq N_{RB}^{DL} \leq N_{RB}^{max,DL}$, wherein $N_{RB}^{min,DL}$ denotes the smallest downlink bandwidth supported by a wireless communication system and $N_{RB}^{max,RB}$ denotes the greatest downlink bandwidth supported by the wireless communication system. $N_{RB}^{min,DL}$ may be 6 and $N_{RB}^{max,RB}$ may be 110. However, the present invention is not limited thereto. The number of OFDM symbols included in one slot may vary according to a cyclic prefix (CP) length and a subcarrier spacing. For MIMO transmission, one resource grid per antenna port may be defined.

Each element in the resource grid for each antenna port is called a resource element (RE) and is uniquely identified by an index pair (k, 1) in a slot, wherein k is a frequency-domain index having any one value of 0 to $N_{RB}^{DL} N_{SC}^{RB}-1$ and 1 is a time-domain index having any one value of 0 to $N_{symb}^{DL}-1$.

The RB illustrated in FIG. 4 is used to describe a mapping relationship between any physical channel and REs. The RB may be divided into a physical resource block (PRB) and a virtual resource block (VRB). One PRB is defined as $N_{symb}^{DL}$ consecutive OFDM symbols in the time domain and $N_{SC}^{RB}$ consecutive subcarriers in the frequency domain, wherein $N_{symb}^{DL}$ and $N_{SC}^{RB}$ may be predetermined values. For example, $N_{symb}^{DL}$ and $N_{SC}^{RB}$ may be given as shown in the following Table 3. Accordingly, one PRB includes $N_{symb}^{DL} \times N_{SC}^{RB}$ REs. Although one PRB may correspond to one slot in the time domain and to 180 kHz in the frequency domain, the PRB is not limited thereto.

TABLE 3

| Configuration | | $N_{SC}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has a value ranging from 0 to $N_{RB}^{DL}-1$. The relationship between a PRB number $n_{PRB}$ in the frequency domain and a RE (k,1) in one slot satisfies $$n_{PRB} = \left\lfloor \frac{k}{N_{SC}^{RB}} \right\rfloor.$$

The size of the VRB is the same as the size of the PRB. The VRB may be divided into a localized VRB (LVRB) and a distributed VRB (DVRB). With respect to each type of VRB, one pair of VRBs in two slots in one subframe is allocated together with a single VRB number $n_{VRB}$.

The size of the VRB may be the same as the size of the PRB. Two types of VRBs are defined: a localized VRB (LVRB) and a distributed VRB (DVRB). With respect to each type of VRB, a pair of VRBs is allocated over two slots of one subframe with a single VRB index (hereinafter, this may be referred to as a VRB number). In other words, any one of indexes ranging from 0 to $N_{RB}^{DL}-1$ is allocated to each of $N_{RB}^{DL}$ VRBs belonging to a first slot of two slots constituting one subframe and any one of indexes ranging from 0 to $N_{RB}^{DL}-1$ is likewise allocated to each of $N_{RB}^{DL}$ VRBs belonging to a second slot of two slots constituting one subframe.

Hereinbelow, PDCCH transmission of a BS to a UE in an LTE system will be described.

The BS determines a PDCCH format according to DCI to be transmitted to the UE and attaches a CRC to control information. The CRC is masked with a unique identifier (referred to as an RNTI) according to the owner or usage of the PDCCH. If the PDCCH is dedicated to a specific UE, the CRC may be masked with a unique identifier of the UE, e.g. C-RNTI. If the PDCCH is dedicated to a paging message, the CRC may be masked with a paging indication identifier, e.g. paging-RNTI (P-RNTI). If the PDCCH is for system information, the CRC may be masked with a system information RNTI (SI-RNTI). The CRC may be masked with a random access RNTI (RA-RNTI) to indicate a random access response that is a response to a random access preamble of the UE. The following Table 4 shows exemplary identifiers masked within a PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If the C-RNTI is used, the PDCCH carries control information for a corresponding specific UE and, if other RNTIs are used, the PDCCH carries common control information received by all or plural UEs in a cell. The BS channel-codes DCI to which CRC is attached to generate coded data. The BS performs rate matching according to the number of CCEs allocated to a PDCCH format. Next, the BS modulates the coded data to generate modulated symbols and maps the modulated symbols to physical REs.

Figure 5:
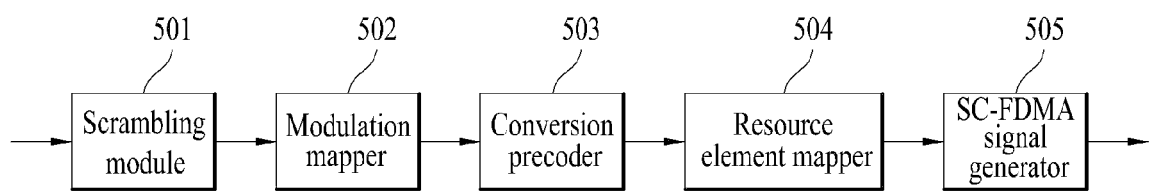
FIG. 5 is a diagram illustrating a signal processing operation of a UE for transmitting an uplink signal.

FIG. 5 is a diagram illustrating a signal processing operation of a UE for transmitting an uplink signal.

Referring to FIG. 5, a scrambling module 510 may scramble a transmission signal using a scrambling signal in order to transmit an uplink signal. A modulation mapper 520 modulates the scrambled signal to complex modulation symbols using binary phase shift keying (BPSK), quadrature phase shift keying (QPSK), or 16 quadrature amplitude modulation (QAM)/64 QAM according to the type of the transmission signal or a channel state. A conversion precoder 530 processes the complex modulation symbols. An RE mapper 540 may map the complex modulation symbols to time-frequency REs. After being processed in an SC-FDMA signal generator 550, the mapped signal may be transmitted to a BS through an antenna.

Hereinafter, a description of PUCCH formats defined in LTE release-8 and uplink transmit power of a UE will be given. A PUCCH is an uplink control channel carrying uplink control information. In an LTE system, a PUCCH and a PUSCH cannot be transmitted at the same time due to a single carrier property. In an LTE-A system, however, the UE may transmit the PUCCH together with the PUSCH in a specific component carrier (e.g. a primary component carrier or a primary cell (PCell)) due to introduction of multiple carriers. The PUCCH supports a plurality of formats and PUCCH formats supported in LTE release-8 are illustrated in Table 5. Here, PUCCH formats 2a and 2b support only a normal CP.

TABLE 5

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The following Equation 1 indicates uplink power in dBm for uplink control channel transmission of the UE in LTE release-8.

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$ [Equation 1]

where i denotes a subframe index, $P_{CMAX}$ denotes UE maximum transmittable power, $P_{O\_PUCCH}$ is a parameter composed of the sum of cell-specific parameters provided by the BS through higher layer signaling, and PL is a downlink pathloss (or signal loss) estimate calculated in the UE in dB and is expressed as PL=referenceSignalPower−higher layer filtered RSRP. h(n) differs according to PUCCH formats, nCQI denotes the number of bits for cannel quality information (CQI), and nHARQ denotes the number of bits for HARQ. $\Delta_{F\_PUCCH}(F)$ is a value corresponding to PUCCH format (F) as a value relative to PUCCH format 1a and is provided by the BS through higher layer signaling. g(i) denotes a current PUCCH power control adjustment state of the subframe index i. h(nCQI,nHARQ) is 0 in PUCCH formats 1, 1a, and 1b and may be expressed as in the following Equation 2 in the case of a normal CP in PUCCH formats 2, 2a, and 2b.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases}$$ [Equation 2]

The following Table 6 shows $\delta_{PUCCH}$ values mapped to TPC command fields in DCI formats 1A/1B/1D/1/2A/2/2 and Table 7 shows $\delta_{PUCCH}$ values mapped to TPC commands in DCI format 3A. Here, $\delta_{PUCCH}$ is a UE-specific correction value (or a power correction value).

TABLE 6

| TPC Command Field in DCI format 1A/1B/1D/1/2A/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

FIGS. 6a to FIG. 8b are diagram explaining multiple carriers of a BS and multiple carriers of a UE.

An environment considered in the present invention includes all general multicarrier support environments. That is, a multicarrier system or carrier aggregation (CA) system specified in the present invention refers to a system aggregating one or more carriers each having a narrower bandwidth than a target bandwidth during configuration of a broad band targeted to support broad band. When one or more carriers having a narrower bandwidth than a target bandwidth is aggregated, the bandwidth of the aggregated carriers may be limited to bandwidth used in a legacy system in order to maintain backward compatibility with the legacy system. For example, a legacy 3GPP LTE system may support bandwidth of {1.4, 3, 5, 10, 15, 20 MHz} and an LTE-A system may support bandwidth wider than 20 MHz using only the bandwidth supported in the LTE system. Alternatively, new bandwidth may be defined to support CA irrespective of bandwidth used in the legacy system.

The term multicarrier is used interchangeably with the term CA or bandwidth aggregation. Contiguous CA, non-contiguous CA and spectrum aggregation are collectively referred to as CA.

Figure 6A:
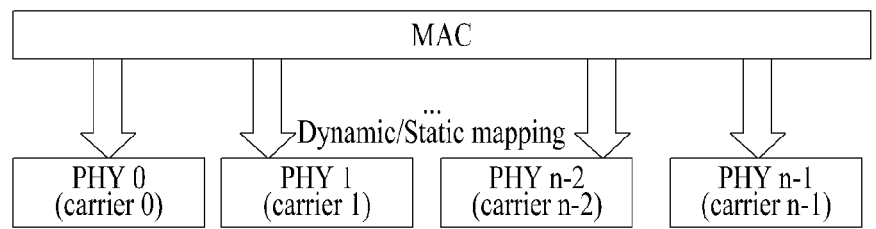
FIG. 6a is a diagram explaining multiple carriers of a BS.
Figure 6B:
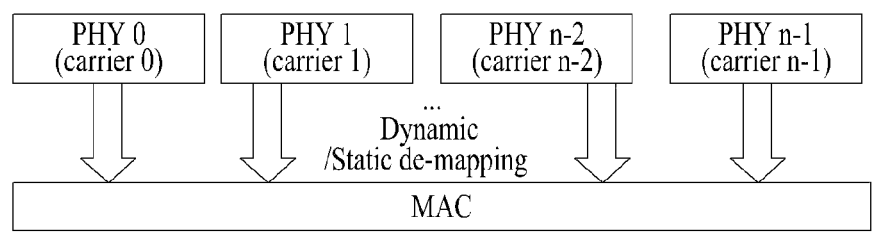
FIG. 6b is a diagram explaining multiple carriers of a UE.

A technique for managing multiple carriers by one media access control (MAC) layer to efficiently use multiple carriers will now be described. A transmitter and a receiver for managing multiple carriers are illustrated in FIG. 6a and FIG. 6b, respectively. To efficiently transmit/receive multiple carriers, both the transmitter and the receiver should transmit/receive multiple carriers.

In brief, one MAC layer manages/operates one or more frequency carriers so as to transmit/receive the carriers. Since the frequency carriers managed by one MAC layer need not be contiguous, more flexible resource management is possible. Both contiguous CA and non-contiguous CA may be performed.

In addition to the structures illustrated in FIGS. 6a and 6b, one or several MAC layers rather than one MAC layer may manage a plurality of physical (PHY) layers as illustrated in FIGS. 7a, 7b, 8a, and 8b.

Figure 7A:
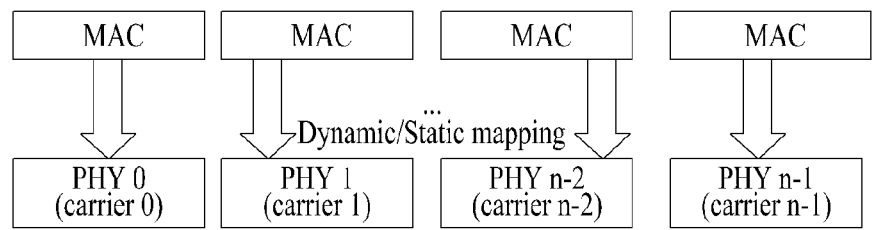
FIG. 7a is a diagram explaining multiple carriers of a BS.
Figure 7B:
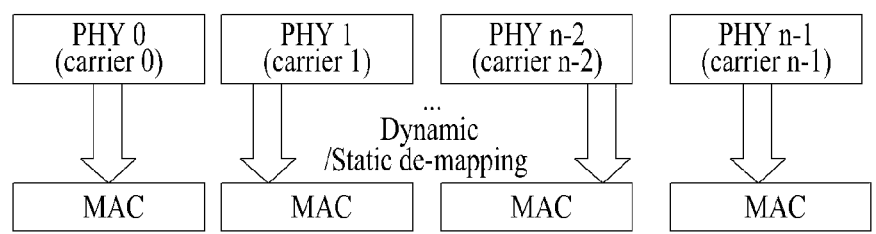
FIG. 7b is a diagram explaining multiple carriers of a UE.
Figure 8A:
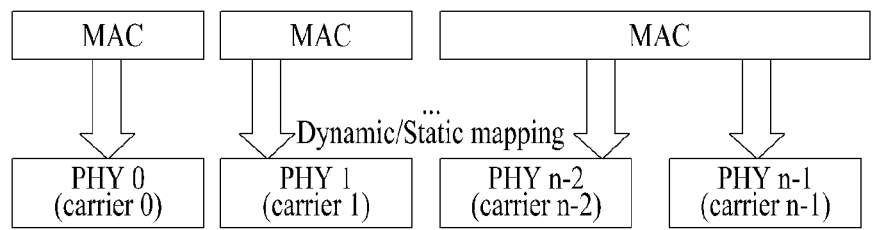
FIG. 8a is a diagram explaining multiple carriers of a BS.
Figure 8B:
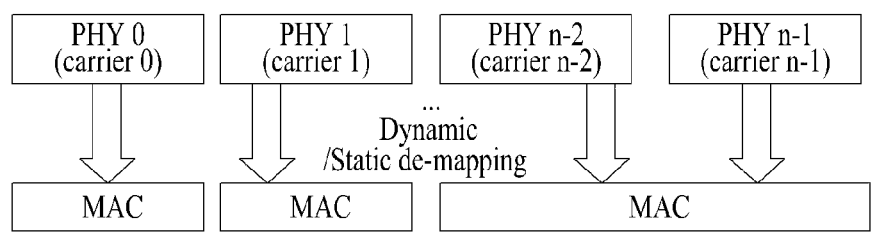
FIG. 8b is a diagram explaining multiple carriers of a UE.

As shown in FIGS. 7a and 7b, each MAC layer may control each carrier in one-to-one correspondence. Alternatively, as shown in FIGS. 8a and 8b, each MAC layer may control each carrier in one-to-one correspondence with respect to some carriers and one MAC layer may control one or more carriers with respect to the other carriers.

The system applied to the above description is a system supporting one carrier to N multiple carriers and carriers may be contiguously or non-contiguously used, regardless of uplink/downlink. A TDD system is configured to manage N carriers each including downlink and uplink transmission and an FDD system is configured to respectively use multiple carriers in each of uplink and downlink. In legacy LTE release-8, although uplink bandwidth may be different from downlink bandwidth, transmission/reception in a single carrier has basically been supported. However, in an LTE-A system, a plurality of carriers may be used through CA as described above. Furthermore, the FDD system may support asymmetric CA in which the number of aggregated carriers and/or the bandwidth of carriers is different with respect to uplink and downlink.

However, CA is configured only in an intra-band or by a combination of CCs of inter-bands. In the prior art, one uplink timing adjustment (TA) is set irrespective of CA configuration. However, it may be difficult to set one UL TA due to the difference of frequency characteristics between inter-bands. If multiple TA groups are supported in consideration of such characteristics, multiple PCells may be formed. Since the prior art is designed based on one TA and one PCell, problems may arise when a plurality of TAs and PCells are supported.

Figure 9:
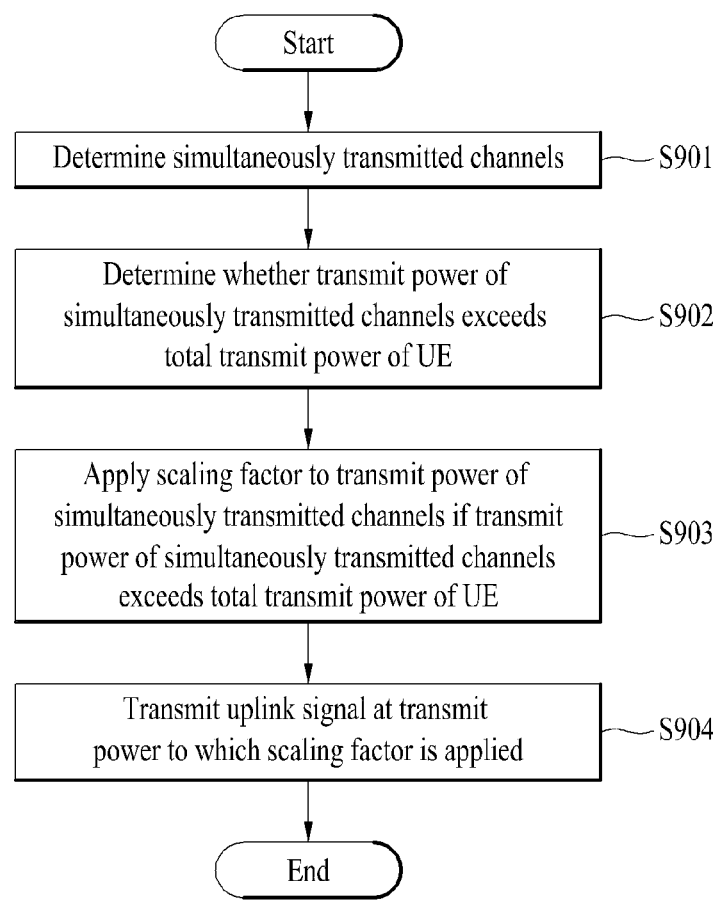
FIG. 9 is a flowchart of an uplink transmit power control method according to the present invention.

FIG. 9 is a flowchart of an uplink transmit power control method according to the present invention.

Referring to FIG. 9, the UE determines simultaneously transmitted channels (S901). The UE determines whether transmit power of the simultaneously transmitted channels exceeds total transmit power of the UE (S902). If the transmit power of the simultaneously transmitted channels exceeds the total transmit power of the UE, a scaling factor is applied to the transmit power of the simultaneously transmitted channels (S903). The UE transmits an uplink signal at transmit power to which the scaling factor is applied (S904).

Channels may be defined as a first type of channels corresponding to a plurality of PUCCHs, a second type of channels corresponding to PUSCHs including a plurality of uplink control information (UCI), and a third type of channels corresponding to PUSCHs which do not include the plurality of UCI. In the case in which at least one type of channels among the first to third types of channels are simultaneously transmitted in a specific cell, uplink transmit power for the at least one type of channels may be determined. In addition, if transmit power of the at least one type of channels exceeds maximum transmittable power of the UE or remaining transmit power of the UE, the uplink transmit power may be determined by applying a scaling factor to a power value of the at least one type of channels.

If multiple TA groups are formed in a CA support system, the TA groups may be configured by a TA group including a PCell and a TA group including only secondary cells (SCells), by TA groups in which a PCell is present per TA group, or by a TA group including a plurality of PCells and a TA group including only SCells. A TA group means a set of uplink resources sharing the same TA value. One TA group may be configured by one serving cell. The relationship between configured CCs and a TA group should be specified by a BS. One TA group includes one or more cells/CCs. If one or more PCells are present, the UE may simultaneously transmit PUCCHs corresponding in number to the PCells. Currently, the concept of a PCell is a linked or paired downlink/uplink cell/CC (hereinafter, referred to as a cell) in the case of FDD. Then, in terms of power control, the number of DL cells for estimating DL pathloss should be also extended to the number of DL PCells. The UE may calculate DL pathloss by measuring received power of a reference signal (RSRP) of a configured DL PCell and use the DL pathloss for uplink power control. The UE should estimate RSRP/RSRQ per configured PCell to report the estimated RSRP/RSRQ to the BS.

A CC index should be added to Equation 1 of a PUCCH power control equation. Accordingly, CC index added power control conforms to Equation 3.

$$P_{PUCCH,c}(i) = \min \begin{Bmatrix} P_{CMAX,c}(i), \\ P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i) \end{Bmatrix}$$

[Equation 3]

If transmit power of channels exceeds total transmit power of the UE, methods described below may be considered. In the following equations, y(i), x(i), and w(i) are scaling factors. Although the scaling factor set by the UE is used, the same value may be equally applied to each cell or a value set to 0 may be allocated to one or more cells as the scaling factor.

Alternatively, a scaling factor setting value may be signaled by the BS according to a scaling factor of a PCell, the amount of information of PUCCHs, the type of information of PUCCHs, or long or short information at a recent transmission time point or may use a predetermined value. Alternatively, the UE may set different scaling factors. If one UE performs multiple transmissions in multiple PCells, power of PUCCHs/PUSCHs per CC is determined based on the power control equation and then a scaling-down process is added in terms of maximum transmit power of the UE so that the sum of power of all transmission PUCCHs and/or power of PUSCHs with or without UCI does not exceed the maximum transmittable power of the UE. If the sum does not exceed the maximum transmittable power of the UE, power determined in the first step is allocated and transmitted. If the sum exceeds the maximum transmittable power, the following methods should be additionally considered.

First, if the transmit power of multiple PUCCHs exceeds the maximum transmittable power, the same value per cell may be applied or a value set to 0 may be applied to one or more cells as the scaling factor of y(i) to satisfy Equation 4. Here, y(i) is the scaling factor for the PUCCHs.

$$\sum_c y(i) \cdot \hat{P}_{PUCCH,c}(i) \le \hat{P}_{CMAX}(i) \qquad \text{[Equation 4]}$$

Second, if a PUCCH is absent and transmit power of multiple PUSCHs with UCI exceeds the maximum transmit power of the UE, a scaling factor of x(i) may be adjusted to satisfy Equation 5. Here, $$\sum_j \hat{P}_{PUSCH,j}(i)$$

is the sum of power of the PUSCHs with UCI.

$$\sum_j x(i) \cdot \hat{P}_{PUSCH,j}(i) \le \hat{P}_{CMAX}(i) \qquad \text{[Equation 5]}$$

Third, when multiple PUCCHs and multiple PUSCHs without UCI are simultaneously transmitted, if the sum of transmit power of the multiple PUCCHs does not exceed $\hat{P}_{CMAX}(i)$, transmit power of the PUSCHs is adjusted by applying a scaling factor of w(i) to $$\sum_c \hat{P}_{PUSCH,c}(i)$$

to satisfy Equation 6. Here, $$\sum_c \hat{P}_{PUSCH,c}(i)$$

is the sum of power of the PUSCHs without the UCI and $$\sum_c \hat{P}_{PUCCH,c}(i)$$

is the sum of power of the PUCCHs.

$$\sum_c w(i) \cdot \hat{P}_{PUSCH,c}(i) \le \left( \hat{P}_{CMAX}(i) - \sum_c \hat{P}_{PUCCH,c}(i) \right) \qquad \text{[Equation 6]}$$

Fourth, when multiple PUSCHs with UCI and multiple PUSCHs without the UCI are simultaneously transmitted, if the sum of transmit power of the multiple PUSCHs with the UCI does not exceed $\hat{P}_{CMAX}(i)$, a scaling factor of w(i) is applied to transmit power of the multiple PUSCHs without the UCI to satisfy Equation 7.

$$\sum_{c \ne j} \hat{P}_{PUSCH,c}(i)$$

denotes the sum of power of the PUSCHs without the UCI and $$\sum_j \hat{P}_{PUSCH}(i)$$

denotes the sum of the PUSCHs with the UCI.

$$\sum_{c \ne j} w(i) \cdot \hat{P}_{PUSCH,c}(i) \le \left( \hat{P}_{CMAX}(i) - \sum_j \hat{P}_{PUSCH}(i) \right) \qquad \text{[Equation 7]}$$

Fifth, when multiple PUCCHs, multiple PUSCHs with UCI, and multiple PUSCHs without the UCI are simultaneously transmitted, if the sum of transmit power of the multiple PUCCHs and the sum of transmit power of the multiple PUSCHs with the UCI do not exceed $\hat{P}_{CMAX}(i)$, a scaling factor w(i) is applied to transmit power of the multiple PUSCHs without the UCI to satisfy Equation 8. In Equation 8, $$\sum_{c \ne j} \hat{P}_{PUSCH,c}(i)$$

denotes the sum of power of the PUSCHs without the UCI, $$\sum_c \hat{P}_{PUCCH,c}(i)$$

denotes the sum of power of the PUCCHs, and $$\sum_j \hat{P}_{PUSCH,j}(i)$$

denotes the sum of power of the PUSCHs with the UCI.

$$\sum_{c \ne j} w(i) \cdot \hat{P}_{PUSCH,c}(i) \le \left( \hat{P}_{CMAX}(i) - \sum_c \hat{P}_{PUCCH}(i) - \sum_j \hat{P}_{PUSCH,j}(i) \right) \qquad \text{[Equation 8]}$$

Sixth, if PUCCHs and PUSCHs with UCI in PCells are simultaneously transmitted or if PUCCHs and PUSCHs with the UCI in PCells are simultaneously transmitted in PCells and PUSCHs without the UCI are transmitted in another cell, a linear value of transmit power of the PUSCHs is obtained according to the following Equation 9 or Equation 10. In addition, transmit power is controlled by applying a scaling factor w(i) to transmit power of the PUSCHs with the UCI to satisfy Equation 11. This is applied when the sum of power of PUSCHs including UCI and total transmit power in cells in which PUCCHs are transmitted does not exceed $\hat{P}_{CMAX}(i)$.

In Equation 9 and Equation 10, $$\sum_c \hat{P}_{PUCCH,c}(i)$$

represents a total power value in cells in which PUCCHs are transmitted. In Equation 11, $$\sum_{c \neq j} \hat{P}_{PUSCH,c}(i)$$

denotes the sum of power of PUSCHs without UCI, $$\sum_j \hat{P}_{PUCCH,j}(i)$$

denotes the sum of power of PUCCHs, and $$\sum_j \hat{P}_{PUSCH,j}(i)$$

denotes the sum of power of PUSCHs with UCI.

$$\hat{P}_{PUSCH,j}(i) = \min(\hat{P}_{PUSCH,j}(i), (\hat{P}_{CMAX}(i) - \hat{P}_{PUCCH,j}(i))) \quad \text{[Equation 9]}$$

$$\hat{P}_{PUSCH,j}(i) = \quad \text{[Equation 10]}$$
$$\min\left(\hat{P}_{PUSCH,j}(i), \left(\hat{P}_{CMAX}(i) - \sum_c \hat{P}_{PUCCH,c}(i)\right)\right)$$

$$\sum_{c \neq j} w(i) \cdot \hat{P}_{PUSCH,c}(i) \leq \quad \text{[Equation 11]}$$
$$\left(\hat{P}_{CMAX}(i) - \sum_j \hat{P}_{PUCCH,j}(i) - \sum_j \hat{P}_{PUSCH,j}(i)\right)$$

Although indexing schemes and notation expressed in the above equations are different, each expression means the sum of power of PUCCHs allocated in multiple cells and the sum of power of PUSCHS with or without UCI. The basic premise for supporting the above methods is that priority per transmission channel is determined in order of PUCCHs> PUSCHs with UCI> PUSCHs without UCI. In summary, the methods based on this premise are performed such that power of PUCCHs per cell is calculated, power of PUSCHs with or without the UCI is calculated using a conventional method depending on whether PUCCHs are present, and, if the sum of calculated power exceeds maximum transmit power of the UE, the above methods may be applied according to each case.

The scaling factors y(i), x(i), and w(i) may be differently configured per TA group.

In an accumulation mode in a (PUSCH/PUCCH) operation method of a TPC command per TA group, accumulated TPC commands per cell in a TA group is reset when the UE of the TA group receives a random access response message. Alternatively, when the UE receives the random access response message in at least one TA group, accumulated TPC commands of all cells are reset. That is, if the operation method of a TPC command received from the BS is accumulation mode, a PCell reference initial value should be set per TA group. For example, in Equation 12, each of $\Delta P_{ramping}$ and $\delta_{msg2}$ should be present per TA group.

A TA maintenance mechanism of a TA group of a PCell is the same as that of release-10.

$$f_c(0) = \Delta P_{rampup} + \delta_{msg2} \quad \text{[Equation 12]}$$

In Equation 13, in PUSCH transmission corresponding to the random access response, a preamble initial reception target power parameter $P_{O\_PRE}$ and $\Delta_{PREAMBLE\_Msg3}$ signaled from a higher layer should be extended per TA group.

$$P_{O\_NOMINAL\_PUSCH,c}(2) = P_{O\_PRE} + \Delta_{PREAMBLE\_Msg3}, \quad \text{[Equation 13]}$$

As indicated in Equation 14, a ranging signal transmit power level for adjusting uplink synchronization should be extended per TA group.

$$PPRACH = \min\{P_{CMAX,c}(i)PREAMBLE\_RECEIVED\_TARGET\_POWER + PL_c\} \quad \text{[Equation 14]}$$

where $P_{CMAX,c}(i)$ is UE transmit power, i denotes a subframe index of a PCell, and $PL_c$ downlink pathloss estimation power calculated in a UE for a PCell.

When physical random access channels (PRACHs) are simultaneously transmitted in two or more PCells or different TA groups, power of the PRACHs is configured not to exceed $\hat{P}_{CMAX}(i)$ using a scaling factor z(i), as indicated in Equation 15.

$$\sum_c z(i) \cdot \hat{P}_{PRACH,c}(i) \leq \hat{P}_{CMAX}(i) \quad \text{[Equation 15]}$$

Referring to Equation 15, z(i) is a scaling factor applied such that the power of PRACHs does not exceed $\hat{P}_{CMAX}(i)$. If the power of PRACHs exceeds the maximum transmit power, a value of a specific cell may be set to 0. For example, when RACHs are transmitted in two cells, if power in one cell exceeds maximum transmit power of the cell and power in the other cell is set to a value less than maximum transmit power so that the sum of power in the cells exceeds the maximum transmit power of the UE, RACH transmit power of a cell exceeding the maximum transmit power of the corresponding cell is set to 0 and necessary RACH power is allocated to the other cell. As mentioned in the prior art, $\hat{P}_{CMAX}(i)$ and $\hat{P}_{PRACH,c}(i)$ are linear values of the maximum transmit power level of the UE. $\hat{P}_{PRACH,c}(i)$ is a linear value of PRACH transmit power.

In addition to scaling factor adjustment considering simultaneous transmission of PUCCHs, PUSCHs with UCI, or PUSCHs without UCI, the following method should be considered in terms of a power headroom report (PHR). In an LTE system, uplink power control may include PUSCH power control, PUCCH power control, and PHR. In order to maintain a single carrier (SC) property in the LTE system, a PUSCH and a PUCCH should be transmitted in different subframes. Accordingly, PUSCHs reported by the UE to the BS differ in maximum transmit power $\hat{P}_{CMAX}(i)$ defined by a class of the UE and PUSCH transmit power calculated in an i-th subframe. An example of generating an event necessary for the PHR includes the case in which measured pathloss is greatly changed or the case in which a prescribed time of a timer elapses.

Therefore, in the present invention, the UE which can simultaneously transmit PUCCHs and PUSCHs with or without UCI should transmit $P_{cmax,c}$ as well in terms of the PHR. In release-10, a transmission method for simply extending the number of PCells to be configured as one MAC control element (CE) and a transmission method for configuring a MAC CE per TA group may be used. A triggering condition may be configured per TA group. For example, a periodic PHR timer, a prohibit PHR timer, and a downlink pathloss power value (dl_pathloss_dB) may be differently configured per TA group. In this case, if an event occurs per TA group, a PHR is transmitted in the presence of PUSCHs. If at least one PUSCH is absent or PHR information cannot be accommodated in PUSCHs, the PHR may be dropped or may be carried in another TA group.

Further, if one downlink PCell is present and a plurality of uplink PCells is present, the present invention may be applied. That is, in an FDD system, asymmetric carrier aggregation having a different number of aggregated carriers and different bandwidth of carriers with respect to uplink and downlink can be supported.

The embodiments described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

[Industrial Applicability]

The method and an apparatus for controlling uplink transmit power are applicable to various mobile communication systems such as 3GPP LTE, LTE-A, IEEE 802, etc.

The invention claimed is:

1. A method for controlling uplink transmit power by a user equipment in a wireless communication system, the method comprising:
    determining an uplink transmit power of at least one type of channels, when the at least one type of channels among a first type of channels corresponding to a plurality of physical uplink control channels (PUCCHs), a second type of channels corresponding to physical uplink shared channels (PUSCHs) with uplink control information (UCI), and a third type of channels corresponding to PUSCHs without the UCI is simultaneously transmitted in a specific cell; and
    transmitting the at least one type of channels at the determined uplink transmit power,
    wherein the uplink transmit power is determined by applying a scaling factor to a power value of the at least one type of channels when the power value exceeds maximum transmittable transmit power of the user equipment or remaining transmit power of the user equipment, and
    wherein the scaling factor is determined in consideration of a timing adjustment (TA) group index which identifies each of a plurality of TA groups, and each TA group of the plurality of TA groups is a set of uplink resources sharing a same TA value.

2. The method according to claim 1, wherein, if only the first type of channels is simultaneously transmitted, the determined uplink transmit power satisfies the condition of Equation A:

$$\sum_c y(i) \cdot \hat{P}_{PUCCH,c}(i) \leq \hat{P}_{CMAX}(i) \quad \text{[Equation A]}$$

where c is a specific cell index, i is a subframe index, y(i) is a scaling factor transmitted in each cell, $\hat{P}_{PUCCH,c}(i)$ is a linear value of transmit power of PUCCHs of the specific cell index c in the subframe index i, and $\hat{P}_{CMAX}(i)$ is a linear value of maximum transmittable transmit power of the user equipment.

3. The method according to claim 1, wherein, if only the second type of channels is simultaneously transmitted, the determined uplink transmit power satisfies the condition of Equation B:

$$\sum_j x(i) \cdot \hat{P}_{PUSCH,j}(i) \leq \hat{P}_{CMAX}(i) \quad \text{[Equation B]}$$

where c is a specific cell index, i is a subframe index, x(i) is a scaling factor transmitted in each cell, $$\sum_j \hat{P}_{PUSCH,j}(i)$$

is the sum of transmit power of the second type of channels, and $\hat{P}_{CMAX}(i)$ is a linear value of maximum transmittable transmit power of the user equipment.

4. The method according to claim 1, wherein, if the first type of channels and the third type of channels are simultaneously transmitted, the remaining transmit power of the user equipment is the difference between the maximum transmittable transmit power of the user equipment and the sum of power of the first type of channels, and determined uplink transmit power of the third type of channels satisfies the condition of Equation C:

$$\sum_c w(i) \cdot \hat{P}_{PUSCH,c}(i) \leq \left(\hat{P}_{CMAX}(i) - \sum_c \hat{P}_{PUCCH}(i)\right) \quad \text{[Equation C]}$$

where c is a specific cell index, i is a subframe index, w(i) is a scaling factor transmitted in each cell, $$\sum_c \hat{P}_{PUSCH,c}(i)$$

is the sum of power of the third type of channels, $$\sum_c \hat{P}_{PUSCH,c}(i)$$

is the sum of power of the first type of channels, and $\hat{P}_{CMAX}(i)$ is a linear value of maximum transmittable transmit power of the user equipment.

5. The method according to claim 1, wherein, if the second type of channels and the third type of channels are simultaneously transmitted, the remaining transmit power of the user equipment is the difference between the maximum transmittable transmit power of the user equipment and the sum of power of the second type of channels, and determined uplink transmit power of the third type of channels satisfies the condition of Equation D:

$$\sum_{c \neq j} w(i) \cdot \hat{P}_{PUSCH,c}(i) \le \left( \hat{P}_{CMAX}(i) - \sum_j \hat{P}_{PUSCH}(i) \right) \quad \text{[Equation D]}$$

where c is a specific cell index, i is a subframe index, w(i) is a scaling factor transmitted in each cell, $$\sum_{c \neq j} \hat{P}_{PUSCH,c}(i)$$

is the sum of power of the third type of channels, $$\sum_j \hat{P}_{PUSCH}(i)$$

is the sum of power of the second type of channels, $\hat{P}_{CMAX}(i)$ is a linear value of maximum transmittable transmit power of the user equipment.

6. The method according to claim 1, wherein if the first type of channels, the second type of channels, and the third type of channels are simultaneously transmitted, the remaining transmit power of the user equipment is the difference between the maximum transmittable transmit power of the user equipment, the sum of power of the first type of channels, and the sum of power of the second type of channels, and determined uplink transmit power of the third type of channels satisfies the condition of Equation E:

$$\sum_{c \neq j} w(i) \cdot \hat{P}_{PUSCH,c}(i) \le \quad \text{[Equation E]}$$
$$\left( \hat{P}_{CMAX}(i) - \sum_c \hat{P}_{PUCCH}(i) - \sum_j \hat{P}_{PUSCH,j}(i) \right)$$

where c is a specific cell index, i is a subframe index, w(i) is a scaling factor transmitted in each cell, $$\sum_{c \neq j} \hat{P}_{PUSCH,c}(i)$$

is the sum of power of the third type of channels, $$\sum_j \hat{P}_{PUSCH,j}(i)$$

is the sum of power of the second type of channels, $$\sum_c \hat{P}_{PUCCH}(i)$$

is the sum of power of the first type of channels, and $\hat{P}_{CMAX}(i)$ is a linear value of maximum transmittable transmit power of the user equipment.

7. The method according to claim 1, wherein if the first type of channels and the second type of channels are simultaneously transmitted in specific cells and if the third type of channels is simultaneously transmitted in another cell, the remaining transmit power of the user equipment is the difference between the maximum transmittable transmit power of the user equipment, the sum of power of the first type of channels, and the sum of power of the second type of channels, and determined uplink transmit power of the third type of channels satisfies the condition of Equation F:

$$\sum_{c \neq j} w(i) \cdot \hat{P}_{PUSCH,c}(i) \le \quad \text{[Equation F]}$$
$$\left( \hat{P}_{CMAX}(i) - \sum_j \hat{P}_{PUCCH,j}(i) - \sum_j \hat{P}_{PUSCH,j}(i) \right)$$

where c is a specific cell index, i is a subframe index, w(i) is a scaling factor transmitted in each cell, $$\sum_{c \neq j} \hat{P}_{PUSCH,c}(i)$$

is the sum of power of the third type of channels, $$\sum_j \hat{P}_{PUSCH,j}(i)$$

is the sum of the second type of channels, $$\sum_j \hat{P}_{PUCCH,j}(i)$$

is the sum of the first type of channels, and $\hat{P}_{CMAX}(i)$ is a linear value of maximum transmittable transmit power of the user equipment.

8. A user equipment for controlling uplink transmit power in a multiple access wireless communication system, the user equipment comprising:

a processor for determining an uplink transmit power of at least one type of channels, when the at least one type of channels among a first type of channels corresponding to a plurality of physical uplink control channels (PUCCHs), a second type of channels corresponding to physical uplink shared channels (PUSCHs) with uplink control information (UCI), and a third type of channels corresponding to PUSCHs without the UCI is simultaneously transmitted in a specific cell; and a transmit antenna for transmitting the at least one type of channels at the determined uplink transmit power, wherein the uplink transmit power is determined by applying a scaling factor to a power value of the at least one type of channels when the power value exceeds maximum transmittable transmit power of the user equipment or remaining transmit power of the user equipment, and wherein the scaling factor is determined in consideration of a timing adjustment (TA) group index which identifies each of a plurality of TA groups, and each TA group of the plurality of TA groups is a set of uplink resources sharing a same TA value.

9. The user equipment according to claim 8, wherein, if only the first type of channels is simultaneously transmitted, the determined uplink transmit power satisfies the condition of Equation A:

$$\sum_c y(i) \cdot \hat{P}_{PUCCH,c}(i) \leq \hat{P}_{CMAX}(i) \quad \text{[Equation A]}$$

where c is a specific cell index, i is a subframe index, y(i) is a scaling factor transmitted in each cell, $\hat{P}_{PUCCH,c}(i)$ is a linear value of transmit power of PUCCHs of the specific cell index c in the subframe index i, and $\hat{P}_{CMAX}(i)$ is a linear value of maximum transmittable transmit power of the user equipment.

10. The user equipment according to claim 8, wherein, if only the second type of channels is simultaneously transmitted, the determined uplink transmit power satisfies the condition of Equation B:

$$\sum_j x(i) \cdot \hat{P}_{PUSCH,j}(i) \leq \hat{P}_{CMAX}(i) \quad \text{[Equation B]}$$

where c is a specific cell index, i is a subframe index, x(i) is a scaling factor transmitted in each cell, $$\sum_j \hat{P}_{PUSCH,j}(i)$$

is the sum of transmit power of the second type of channels, and $\hat{P}_{CMAX}(i)$ is a linear value of maximum transmittable transmit power of the user equipment.

11. The user equipment according to claim 8, wherein, if the first type of channels and the third type of channels are simultaneously transmitted, the remaining transmit power of the user equipment is the difference between the maximum transmittable transmit power of the user equipment and the sum of power of the first type of channels, and determined uplink transmit power of the third type of channels satisfies the condition of Equation C:

$$\sum_c w(i) \cdot \hat{P}_{PUSCH,c}(i) \leq \left(\hat{P}_{CMAX}(i) - \sum_c \hat{P}_{PUCCH}(i)\right) \quad \text{[Equation C]}$$

where c is a specific cell index, i is a subframe index, w(i) is a scaling factor transmitted in each cell, $$\sum_c \hat{P}_{PUSCH,c}(i)$$

is the sum of power of the third type of channels, $$\sum_c \hat{P}_{PUSCH,c}(i)$$

is the sum of power of the first type of channels, and $\hat{P}_{CMAX}(i)$ is a linear value of maximum transmittable transmit power of the user equipment.

12. The user equipment according to claim 8, wherein, if the second type of channels and the third type of channels are simultaneously transmitted, the remaining transmit power of the user equipment is the difference between the maximum transmittable transmit power of the user equipment and the sum of power of the second type of channels, and determined uplink transmit power of the third type of channels satisfies the condition of Equation D:

$$\sum_{c \neq j} w(i) \cdot \hat{P}_{PUSCH,c}(i) \leq \left(\hat{P}_{CMAX}(i) - \sum_j \hat{P}_{PUSCH}(i)\right) \quad \text{[Equation D]}$$

where c is a specific cell index, i is a subframe index, w(i) is a scaling factor transmitted in each cell, $$\sum_{c \neq j} \hat{P}_{PUSCH,c}(i)$$

is the sum of power of the third type of channels, $$\sum_j \hat{P}_{PUSCH}(i)$$

is the sum of power of the second type of channels, $\hat{P}_{CMAX}(i)$ is a linear value of maximum transmittable transmit power of the user equipment.

13. The user equipment according to claim 8, wherein if the first type of channels, the second type of channels, and the third type of channels are simultaneously transmitted, the remaining transmit power of the user equipment is the difference between the maximum transmittable transmit power of the user equipment, the sum of power of the first type of channels, and the sum of power of the second type of channels, and determined uplink transmit power of the third type of channels satisfies the condition of Equation E:

$$\sum_{c \neq j} w(i) \cdot \hat{P}_{PUSCH,c}(i) \leq \qquad \text{[Equation E]}$$

$$\left( \hat{P}_{CMAX}(i) - \sum_{c} \hat{P}_{PUCCH}(i) - \sum_{j} \hat{P}_{PUSCH,j}(i) \right)$$

where c is a specific cell index, i is a subframe index, w(i) is a scaling factor transmitted in each cell, $$\sum_{c \neq j} \hat{P}_{PUSCH,c}(i)$$

is the sum of power of the third type of channels, $$\sum_{j} \hat{P}_{PUSCH,j}(i)$$

is the sum of power of the second type of channels, $$\sum_{c} \hat{P}_{PUSCH}(i)$$

is the sum of power of the first type of channels, and $\hat{P}_{CMAX}(i)$ is a linear value of maximum transmittable transmit power of the user equipment.

14. The user equipment according to claim 8, wherein if the first type of channels and the second type of channels are simultaneously transmitted in specific cells and if the third type of channels is simultaneously transmitted in another cell, the remaining transmit power of the user equipment is the difference between the maximum transmittable transmit power of the user equipment, the sum of power of the first type of channels, and the sum of power of the second type of channels, and determined uplink transmit power of the third type of channels satisfies the condition of Equation F:

$$\sum_{c \neq j} w(i) \cdot \hat{P}_{PUSCH,c}(i) \leq \qquad \text{[Equation F]}$$

$$\left( \hat{P}_{CMAX}(i) - \sum_{j} \hat{P}_{PUCCH,j}(i) - \sum_{j} \hat{P}_{PUSCH,j}(i) \right)$$

where c is a specific cell index, i is a subframe index, w(i) is a scaling factor transmitted in each cell, $$\sum_{c \neq j} \hat{P}_{PUSCH,c}(i)$$

is the sum of power of the third type of channels, $$\sum_{j} \hat{P}_{PUSCH,j}(i)$$

is the sum of the second type of channels, $$\sum_{j} \hat{P}_{PUSCH,j}(i)$$

is the sum of the first type of channels, and $\hat{P}_{CMAX}(i)$ is a linear value of maximum transmittable transmit power of the user equipment.

\* \* \* \* \*